(12) United States Patent
Popper et al.

(10) Patent No.: US 6,203,636 B1
(45) Date of Patent: Mar. 20, 2001

(54) METHOD OF IMPARTING A GRAPHIC DESIGN TO A SUBSTRATE

(75) Inventors: Peter Popper, Wilmington; Mark Stephen Edwards, Hockessin; William Charles Walker, Wilmington, all of DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/040,564

(22) Filed: Mar. 18, 1998

(51) Int. Cl.[7] ................................................. A46D 1/00
(52) U.S. Cl. ...................... 156/72; 156/73.2; 156/166; 156/173; 156/271
(58) Field of Search ..................... 156/93, 94, 200, 156/304, 98, 72, 73.2, 166, 173, 271; 428/63, 90, 195

(56) References Cited

U.S. PATENT DOCUMENTS

| | | | |
|---|---|---|---|
| 3,884,743 | * 5/1975 | Kunak et al. | 156/304 |
| 4,733,864 | * 3/1988 | Casteel | 273/17 |
| 4,911,773 | * 3/1990 | Leighton | 156/98 |
| 5,470,629 | 11/1995 | Mokhtar et al. | 428/85 |
| 5,472,762 | 12/1995 | Edwards et al. | 428/93 |

FOREIGN PATENT DOCUMENTS

| | | | |
|---|---|---|---|
| 8505767 | 6/1987 | (BR) | D02G/3/36 |
| 25 06 720 | 8/1976 | (DE) | D06Q/1/00 |

* cited by examiner

*Primary Examiner*—Merrick Dixon

(57) ABSTRACT

A method is disclosed for imparting a graphic design to the upper surface of a fabric suitable for use as a wall or floor covering. The graphic design is formed by an elongated pile article having a plurality of filament bundles attached to an elongated support strand. The fabric may be a tufted, woven, nonwoven, flocked fabric or a needled felt. The elongated pile article may be attached to the fabric by various methods, including ultrasonically bonding, applying an adhesive, sewing, stapling or using plastic fasteners. A transfer sheet is disclosed to aid in attaching by ultrasonically bonding, the sheet being made from a fusible material having the elongated pile article is attached thereto. The transfer sheet is positioned on the fabric, the elongated pile article is then ultrasonically bonded, melting a portion of the transfer sheet material, and the unmelted portion is then removed.

11 Claims, 5 Drawing Sheets

METHOD OF IMPARTING A GRAPHIC DESIGN TO A SUBSTRATE

BACKGROUND OF THE INVENTION

1. Field of the Invention

The invention relates to a method, and the article produced thereby, for imparting a graphic design to a substrate, such as a pile fabric used as a floor or wall covering, wherein the graphic design is in the form of an elongated pile article having a plurality of filament bundles attached to an elongated support strand.

2. Description of the Prior Art

It is believed desirable in some instances to enhance the aesthetics of a living or work space by imparting a graphic design to the fabric coverings on the floor or walls of the space. The fabric covering for a floor can take the form of a wall-to-wall carpet or an area rug. Both the wall-to-wall carpet or an area rug typically have a support backing and a pile yarn surface. The pile yarn surface of a fabric floor covering may be customized with inlaid yarns. Heretofore, this customization requires the removal of pile yarns in order for the pile yarn surface to receive the inlay yarns. In view of the foregoing, it is believed to be desirable to impart a graphic design to a pile yarn surface without the need to remove pile yarns.

SUMMARY OF THE INVENTION

The present invention relates to a method for imparting a graphic design to a substrate, and to the article produced thereby. Preferably, the substrate is a fabric, such as a pile fabric, that includes a support backing having pile yarns extending therefrom. The predetermined graphic design is configured as a decoration or at least one alphanumeric symbol. In accordance with the present invention the predetermined graphic design is imparted by positioning an elongated pile article on the substrate in the configuration of the predetermined graphic design and attaching the article to the substrate. The elongated pile article has a plurality of filament bundles attached to an elongated support strand. When attached to the substrate the filament bundles of the elongated pile article project from the surface of the substrate. The elongated pile article may be attached to the substrate by ultrasonic bonding, sewing, gluing with a hot melt adhesive, or by mechanical attachment using staples or plastic attachment fasteners.

The invention also relates to a transfer sheet for imparting a predetermined graphic design to a substrate. The transfer sheet comprises a planar foundation layer formed of a fusible material having an elongated pile article attached thereto in the configuration of a predetermined graphic design. The melting temperature of the planar foundation layer is lower than the melting temperatures of the fabric, the support strand and the filament bundles. Preferably, the planar foundation layer is formed of a translucent material.

To impart a predetermined graphic design to a substrate using the transfer sheet, the transfer sheet is positioned at a predetermined location on the substrate, and ultrasonic energy is applied to the elongated pile article thereby attaching the elongated pile article to the fabric and simultaneously melting the planar foundation layer in the vicinity of the elongated pile article. Thereafter, the unmelted, remaining portion of the planar foundation layer is removed from the substrate.

DESCRIPTION OF THE DRAWINGS

The invention will be more fully understood from the following detailed description thereof, taken in connection with the accompanying drawings, which form a part of this application, and in which.

DETAILED DESCRIPTION OF THE INVENTION

Figure 1:
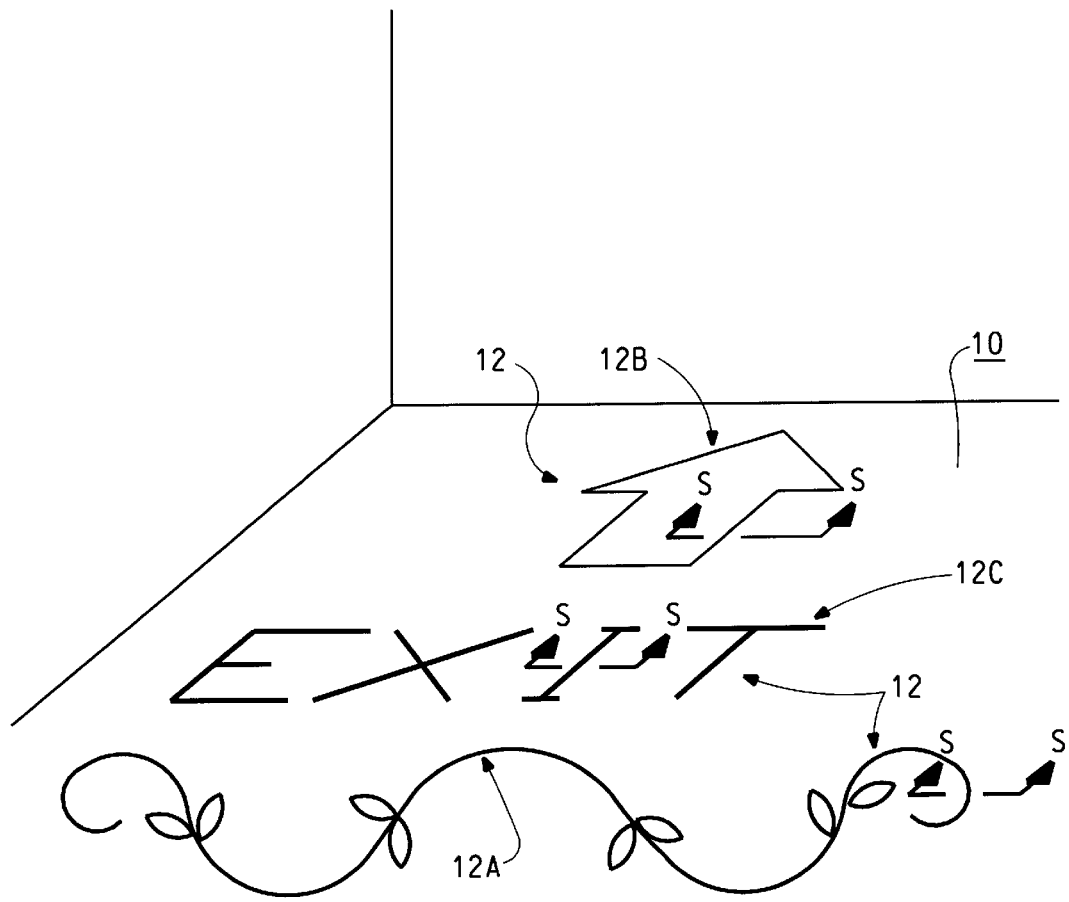
FIG. 1 is a pictorial representation of a substrate having a graphic design imparted thereto in accordance with the present invention, the graphic design including both a decoration and an alphanumeric symbol.

Throughout the following detailed description similar reference numerals refer to similar elements in all Figures of the drawings.

FIG. 1 is a pictorial representation of a typical living or work space having a substrate, generally indicated by the reference character 10, disposed therein. The substrate 10 has a graphic design 12 imparted thereto using the teachings of the present invention. In what is believed the most typical instance the substrate 10 with the graphic design 12 is useful as a floor covering (as is illustrated). However, the substrate 10 may also be usable as a wall covering.

Figure 3:
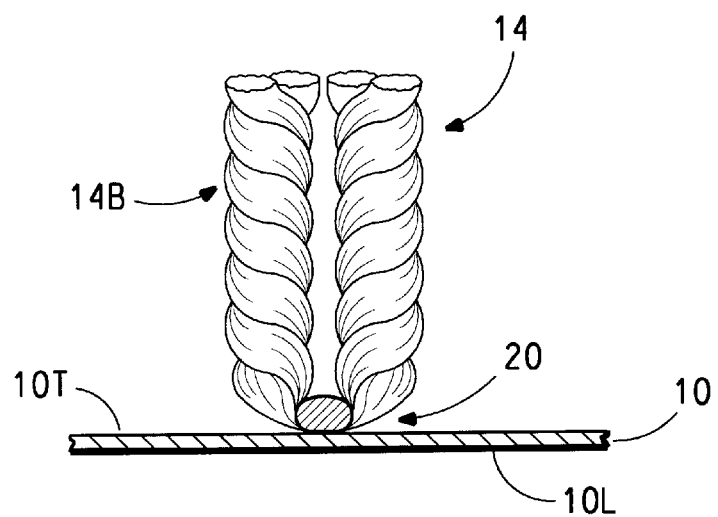
FIG. 3 is a cross-sectional view taken along section lines S—S in FIG. 1 illustrating the ultrasonically bonded attachment of the elongated pile article.

The substrate 10 has an upper surface 10T and a lower surface 10L (FIG. 3). The upper surface 10T may be formed from a tufted pile fabric (i.e., carpet pile), although a woven, nonwoven or flocked fabric, or a needled felt fabric may also be used. The fiber chosen to form the fabric may be selected from the following: nylon, polyester, polyolefin, acrylic, rayon, cotton, wool, silk, and blends thereof. When a tufted pile fabric forms the upper surface of the substrate the upwardly projecting pile yarns are anchored to a support backing fabric, such as that commonly used as carpet backing. As seen in FIG. 1 the graphic design 12 imparted to the substrate 10 may be configured in a decorative configuration (as at 12A), in an informational configuration (as at 12B), or in an alphanumerical configuration (as at 12C) and remain in the contemplation of the present invention.

Figure 2:
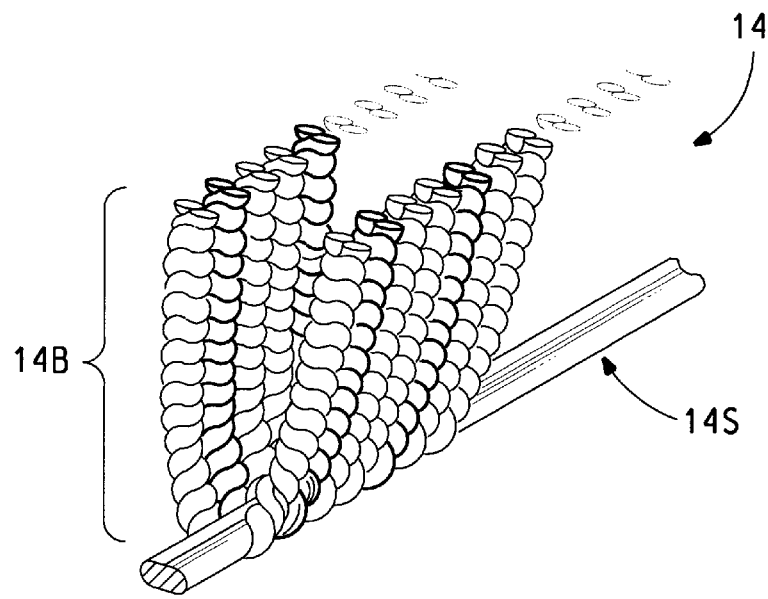
FIG. 2 is a perspective view of an elongated pile article having a plurality of filament bundles attached to an elongated support strand.

As will be developed the graphic design 12 is imparted to the substrate 10 by positioning an elongated pile article 14, illustrated in FIG. 2, on the substrate 10 in the configuration of the predetermined graphic design 12 and attaching the elongated pile article 14 to the substrate. The term "elongated pile article" as used herein refers to a member formed from an elongated support strand 14S to which a plurality of filament bundles 14B are attached. When the elongated pile article 14 is attached to the substrate 10 the filament bundles 14B project upwardly therefrom.

The plurality of filament bundles may be cut or loop pile. The filament bundles 14B are attached to the support strand 14S in such a way that, when the elongated pile article 14 is viewed in cross-section, the filament bundles are generally "U"-shaped. The fiber chosen to form the filament bundles of the elongated pile article may be preferably selected from the following: nylon, polyester, polyolefin, and blends thereof.

The filament bundles 14B are attached to the support strand 14S either on the inside or the outside of the base of the "U". Preferably, as is described in U.S. Pat. Nos. 5,472,762 (Edwards et al.) and Ser. No. 5,470,629 (Mokhtar et al.), assigned to the assignee of the present invention, the filament bundles 14B are attached to the support strand 14S using ultrasonic energy. However, the attachment may be effected by adhesive if desired. The strand may be a monofilament structure, a sheath/core structure, a glass-reinforced structure or a twisted multifilament structure, so long as the material of the outer surface of the support strand is compatible with the composition of the filament bundles so that the preferable melt-attachment may be made.

The method of the present invention may now be described. As a preliminary step, the overall desired effect to be achieved by the imparting of a graphic design 12 to the substrate 10 is determined. This involves determining the color and texture of the graphic design to be imparted, and the type of fabric to which the graphic design will be imparted. The graphic design may be either a decoration or lettering. The decoration may be in the form of a stencil or other predetermined pattern, or may be a design that is made by hand freestyle. In the form of lettering, the elongated pile article may be used for forming customized signs in carpets, rugs or wall hangings.

Decorative considerations will determine exactly what elongated pile article is to be used in the invention. Different colors and textures will alter the decorative effect, as will the pile type, cut or loop, and the pile height of the bundles 14B of the elongated pile article 14. When attached to a pile yarn surface, elongated pile articles having filament bundles significantly longer or shorter than the height of the pile yarn surface may provide desirable effects. For example, a cut pile elongated pile article having long filament bundles may be used in a graphic design to represent a person's hair or whiskers on a cat.

Once the graphic design, the fabric and the elongated pile article have been determined, the elongated pile article 14 is positioned on the substrate 10 in the configuration of the predetermined graphic design 12. The elongated pile article 14 is attached to the substrate 10 by ultrasonic bonding, sewing, gluing with a hot melt adhesive, or mechanically using metal staples or plastic fasteners. Each of these attachment expedients are described below with reference to sectional views (FIGS. 3 to 6) taken along representative section lines S—S in FIG. 1. Regardless of the particular configuration chosen for the design any given attachment expedient may be used to effect attachment of elongated pile article to the substrate 10. For this reason, the section lines S—S are indicated in FIG. 1 as extending through the decorative configuration 12A, the informational configuration 12B, or in an alphanumerical configuration 12C.

Ultrasonic Bonding Method

The elongated pile article may be attached to the substrate 10 by ultrasonically bonding the elongated pile article 14 to the upper surface 10T of the substrate in such a way that the base of the elongated pile article is bonded to the substrate, and the filament bundles 14B extend away from the substrate. As seen from FIG. 3, a dense region 20 is formed by the ultrasonic bonding of the elongated pile article and the substrate as a result of the melting and subsequent solidifying of the elongated pile article and the portion of the substrate adjacent the elongated pile article.

Figures 4A, 4B:
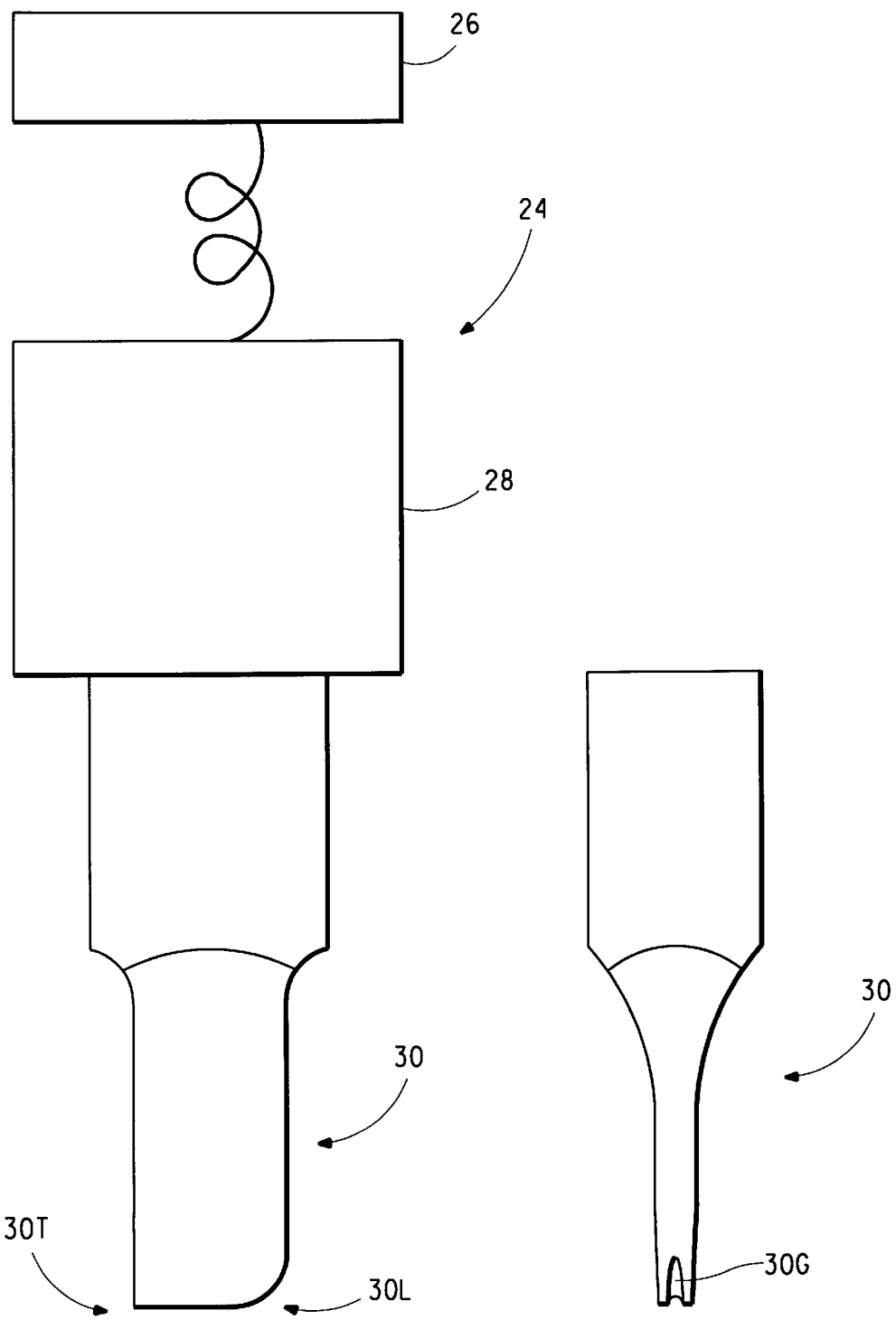
FIGS. 4A and 4B are, respectively, a side elevation and a front view of an apparatus for ultrasonically bonding the elongated pile article.
Figure 5:
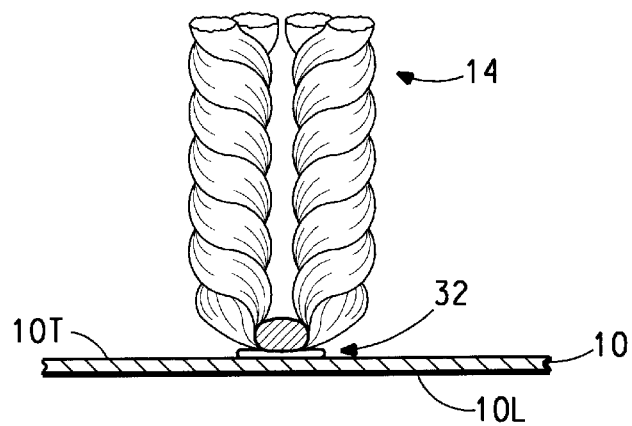
FIG. 5 is a cross-sectional view taken along section lines S—S in FIG. 1 illustrating the hot melt adhesive attachment of the elongated pile article.

An apparatus 24 for use in ultrasonically bonding the elongated pile article to the substrate is shown in FIGS. 4A and 4B. The apparatus includes an ultrasonic generator 26 and a transducer 28, such as those commercially available from Dukane Corporation. A suitable generator has a power rating of one hundred watts (100 W). The transducer is preferably a piezo-electric type transducer. The apparatus also includes a horn 30 described herein being particularly suited for use in the invention. The transducer and the horn are combined in a single hand-held device useful for hand control of the ultrasonic horn tip. The requirements of the apparatus are determined by the melting temperatures of the materials being bonded, i.e., the elongated pile article and the substrate. A suitable apparatus will be rated for a frequency of twenty to seventy kilohertz (20–70 kHz), preferably forty to seventy kilohertz (40–70 kHz), and an amplitude of two to three mils (2–3 mils). The horn is energized by the operator using an on/off switch, located either on the generator or on the hand-held portion of the apparatus.

The tip of the horn refers to the part of the horn that comes into contact with the elongated pile article. The undersurface of the tip of the horn acts as the bonding surface to attach the pile article to the substrate. The undersurface has a narrow rectangular shape, with a narrow groove 30G along the length thereof between the leading corner 30L and the trailing corner 30T. The leading corner in use 30L is a rounded corner, and the other corner, the trailing corner in use 30T is a right angle with no contour.

Using the ultrasonic apparatus 24, the elongated pile article 14 is bonded to the upper surface of the substrate 10T, preferably a pile fabric. The elongated pile article is positioned on the substrate in the configuration of the predetermined graphic design. The elongated pile article is oriented so that the filament bundles 14B project outwardly from the substrate. The groove 30G in the tip of the horn is used to hold the elongated pile article in place during positioning and attaching. Starting at one end of the elongated pile article and moving along the predetermined graphic design to the other end, the elongated pile article is attached to the substrate using the energized apparatus. Light pressure is applied by hand to the elongated pile article with the horn tip for sufficient time to securely bond the elongated pile article to the substrate. This may be repeated as needed until an acceptable bond is achieved. It is advisable to begin bonding at relatively low power and light pressure, test the resulting bond, then increase the power or pressure as needed. The leading corner 30L of the horn tip is moved along the support strand 14S as the elongated pile article 14 is attached. The contour of the leading corner 30L allows the horn to move freely over the elongated pile article. When either end of the elongated pile article is being bonded, the tip of the horn is held on the elongated pile article so that the trailing corner 30T is placed directly over the end of the elongated pile article. The operator of the apparatus thereby has precise control of the horn tip so that it does not overlap the ends of the elongated pile article and inadvertently fuse the substrate.

Adhesives Method

The elongated pile article 14 may be attached to the substrate 10 with a hot melt adhesive. As seen from FIG. 5, a bead of adhesive 32 bonds the elongated pile article 14 to the upper surface of the substrate 10T.

The adhesive 32 may be applied to the substrate 10 using a hot glue gun, such as those commercially available from Enhart Consumers Group, Reading, Pa., under the trademark Thermogrip®. Preferably, the predetermined graphic design 12 is lightly sketched onto the substrate, or a stencil is secured onto the substrate. A small bead of hot melt adhesive may be extruded onto the upper surface of the substrate 10T by directing the tip of the glue gun along the graphic design 12. When the substrate 10 is a tufted pile fabric, the tip of the glue gun must be directed into the pile so that glue is not extruded onto the upper ends of the tufts. Preferably, the adhesive is only applied for a short distance, so that there is sufficient time available to attach the elongated pile article 14 before the adhesive solidifies. In the preferred embodiment, wherein the substrate is a pile fabric, the elongated pile article is inserted into the pile fabric surface with the assistance of a narrow blade. The blade assists in pressing the elongated pile article into the pile fabric. This must be done quickly in order to position the elongated pile article before the hot adhesive solidifies. This cycle of applying adhesive and inserting the elongated pile article is repeated until the entire graphic design is attached. When the design is completely attached, the loose end of the elongated pile article is cut.

Mechanical Fastening Methods

Figure 6:
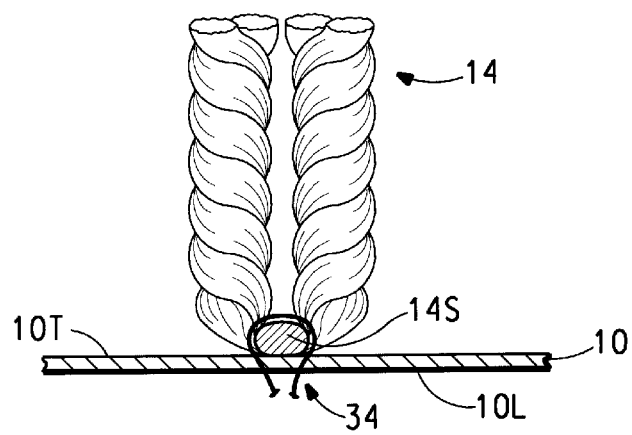
FIG. 6 is a cross-sectional view taken along section lines S—S in FIG. 1 illustrating the mechanical attachment of the elongated pile article using a plastic fastener.
Figure 7:
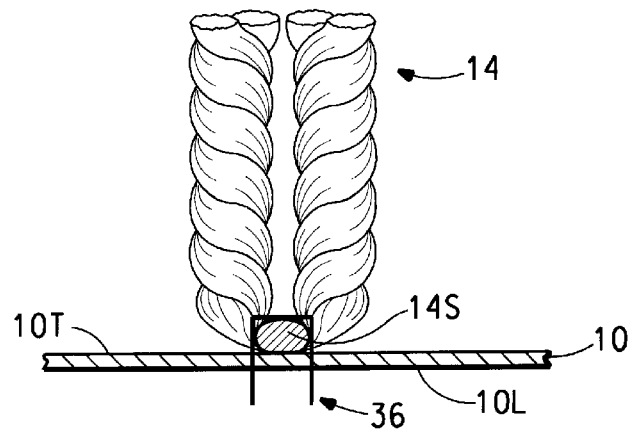
FIG. 7 is a cross-sectional view taken along section lines S—S in FIG. 1 illustrating the mechanical attachment of the elongated pile article using a staple.

The elongated pile article may be attached to the substrate with the use of various mechanical fasteners, including plastic attachment fasteners and staples. As seen in FIG. 6, an elongated pile article 14 is attached to a substrate 10 mechanically using a plastic attachment fastener 34. As seen in FIG. 7, an elongated pile article 14 is attached to a substrate 10 mechanically using a staple 36, the staple passing through the elongated pile article and the substrate and extending into the underlying structure.

The use of plastic attachment fasteners 34 such as those provided with the Buttoneer® fastener attachment system commercially available from Avery Dennison Corporation is particularly suitable for use in attaching an elongated pile article 14 to a substrate 10. The Buttoneer® fastener system, described in U.S. Pat. No. 5,383,260, uses a small hand-held device having two metal prongs to insert plastic fasteners into buttons for use in clothing.

When plastic attachment fasteners 34 are used, the lower surface of the substrate 10L must be in contact with a soft surface such as a carpet pad. The Buttoneer® fastening device is positioned so that the metal prongs are inserted to straddle the support strand 14S of the elongated pile article. By plunging the thumb-operated control, the plastic fastener 34 is inserted and the elongated pile article is attached to the substrate.

The elongated pile article may also be attached to the upper surface of the substrate 10T using staples 36. Using a conventional staple gun, such as that available from Stanley-Bostitch Incorporated, staples are inserted through the elongated pile article, the substrate and into the underlying structure, such as the floor or wall which the substrate is covering. Staples suitable for use in this embodiment are selected based on the thickness and the intended use of the substrate on which the graphic design will be imparted. In the preferred embodiment wherein the substrate is a pile fabric, staples available for use in carpentry or finish work are suitable.

Mechanical attachments are preferred in situations where it is desired to be able to change or remove the graphic design 12 on the substrate, since the plastic fasteners 34 may be cut and the staples 36 may be removed without damage to the substrate.

Sewing Method

An other method for attaching the elongated pile article to the substrate is by sewing the elongated pile article into the upper surface of the substrate. Using carpet thread or clear monofilament thread, the elongated pile article is sewn to the substrate along the support strand. This may be sewn by hand or by machine, wherein the lower surface of the substrate must be accessible. In the preferred embodiment wherein the substrate is a pile fabric, the elongated pile article is sewn to the support backing of the pile fabric.

Bulking

In the cases where staples, sewing thread or plastic fasteners are used to attach the elongated pile article to the upper surface of the substrate it may be desirable to conceal the method of attachment from view. If the filament bundles of the elongated pile article are made from a polymer yarn that is capable of being bulked with the application of heat, such as nylon or polyester, the bulk of the yarn may be increased by applying heat to the elongated pile article. This heat may take the form of hot air or hot moist air, and may be applied to the elongated pile article using a hot air gun, hair dryer, steam iron, or steam wand. Upon heating in this way, the diameter of the yarn increases, so that the yarn hides the staples, sewing thread or plastic fasteners from view.

Transfer Sheet

Figure 8:
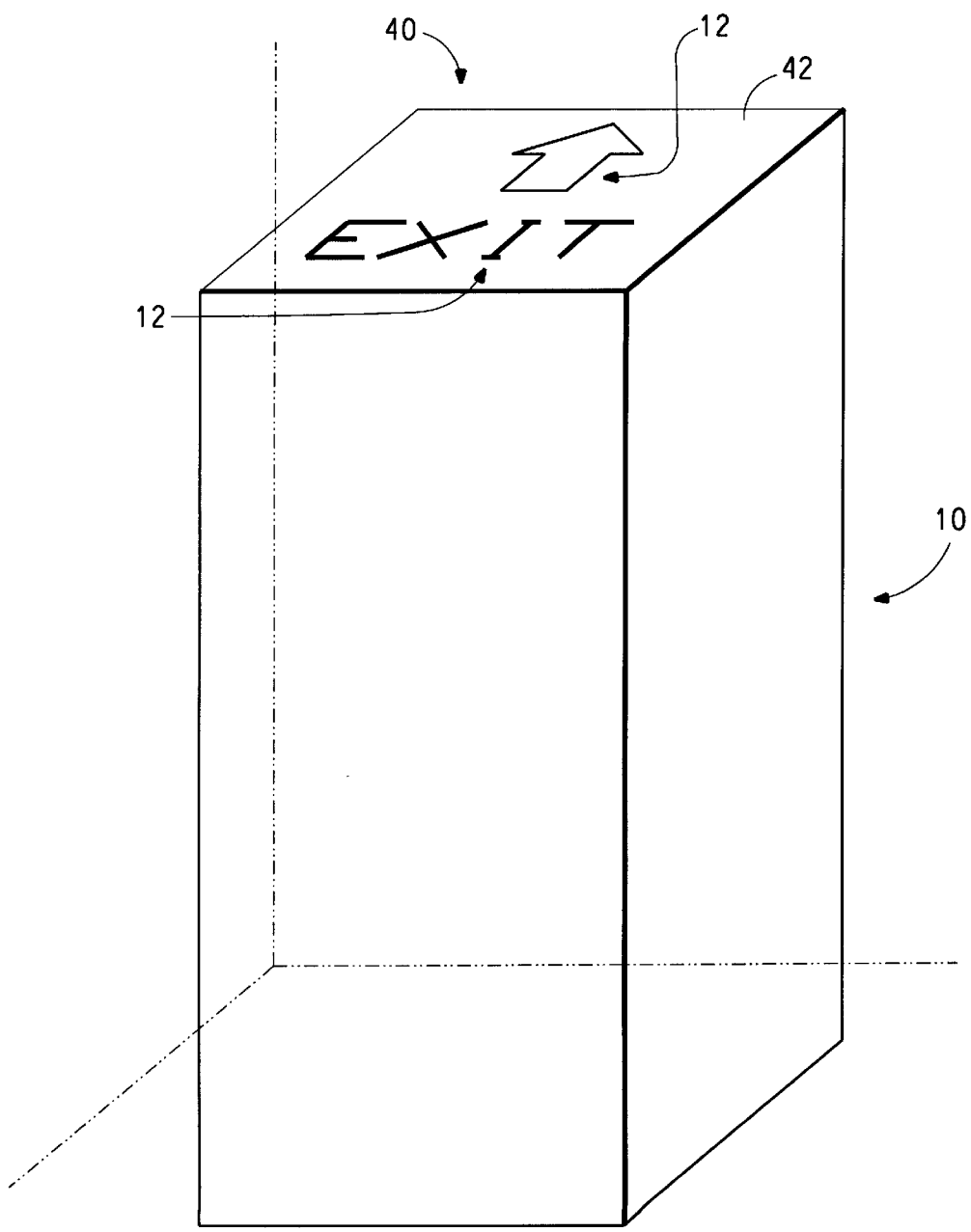
FIG. 8 is an exploded view of a transfer sheet having an elongated pile article in the shape of a graphic design thereon positioned over the substrate on which the design is to be imparted.

Another aspect of the present invention is the use of a transfer sheet to impart a predetermined graphic design to a substrate. FIG. 8 illustrates a transfer sheet 40 having an elongated pile article 14 in the shape of a graphic design 12 thereon, the transfer sheet shown in exploded view over the substrate on which the design is to be imparted. The transfer sheet is a planar foundation layer 42 formed from a fusible material having the elongated pile article attached thereto. The elongated pile article is preferably attached in the configuration of the predetermined graphic design. The melting temperature of the planar foundation layer must be lower than the melting temperature of the substrate material 10, the melting temperature of the support strand 14S and the melting temperature of the filament bundles 14B.

This transfer sheet 40 allows the graphic design 12 to easily be positioned onto the upper surface of the substrate 10T, facilitating attachment thereto. Suitable materials for use as the sheet are nonwoven fabrics available commercially from Applied Extrusion Technologies Incorporated, under the name Delnet®. In order to prepare the transfer sheet for use in the invention the elongated pile article is first positioned on the planar foundation layer 42 in the configuration of the predetermined graphic design 12. The elongated pile article 14 is preferably lightly ultrasonically bonded in various locations so that the elongated pile article is bonded to the transfer sheet 40 sufficiently to be handled without distorting the design 12.

To attach the elongated pile article to the substrate utilizing the transfer sheet the transfer sheet 40 having the elongated pile article 14 attached thereto in the configuration of the predetermined graphic design 12 is placed on the substrate 10 in the desired location. The transfer sheet may be pinned or otherwise secured to the substrate so that the graphic design remains in place during the attachment process. Ultrasonic energy is then applied to the elongated pile article using an ultrasonic horn to bond the elongated pile article, through the transfer sheet, to the substrate as described herein according to the ultrasonically bonding method. Sufficient ultrasonic energy is applied to attach the elongated pile article to the substrate and simultaneously melt the planar foundation layer in the vicinity of the elongated pile article. Because the melting temperature of the planar foundation layer is lower than the melting temperatures of the elongated pile article and the substrate, the planar foundation layer in the vicinity of the elongated pile article will melt completely during the attachment method while the elongated pile article and the substrate will not melt through. Once the entire predetermined graphic design has been attached, the remaining, unmelted portion of the planar foundation layer may be easily removed by hand.

The planar foundation layer is preferably a translucent material, thus allowing the predetermined graphic design and the substrate to be viewed with the graphic design in the desired location before attaching the elongated pile article to the substrate.

In addition to the nonwoven fusible material, the planar foundation layer may include a fusible film such as the coextruded polyolefin film available from E. I. DuPont de Nemours and Company, Incorporated, Wilmington, Del. under the trademark Bynel®.

Those skilled in the art, having the benefit of the teachings of the present invention as hereinabove set forth, may effect numerous modifications thereto. Such modifications are to be construed as lying within the contemplation of the present invention, as defined by the appended claims.

What is claimed is:

1. A method for imparting a predetermined graphic design to a substrate comprising the steps of:
    (a) positioning an elongated pile article on the substrate in the configuration of the predetermined graphic design, the elongated pile article having a plurality of filament bundles attached to an elongated support strand; and,
    (b) attaching the article to the substrate so that the filament bundles project therefrom.

2. The method of claim 1 wherein the substrate comprises a pile fabric having a support backing with pile yarns extending therefrom.

3. The method of claim 1 wherein the elongated pile article is attached to the substrate by ultrasonically bonding.

4. The method of claim 1 wherein the elongated pile article is mechanically attached to the substrate.

5. The method of claim 4 wherein the elongated pile article is attached to the substrate using plastic attachment fasteners.

6. The method of claim 4 wherein the elongated pile article is attached to the substrate using staples.

7. The method of claim 1 wherein the elongated pile article is attached to the substrate using a hot melt adhesive.

8. The method of claim 1 wherein the elongated pile article is attached to the substrate by sewing.

9. The method of claim 1 wherein the predetermined graphic design is a decoration.

10. The method of claim 1 wherein the predetermined graphic design is at least one alphanumeric symbol.

11. A method for imparting a predetermined graphic design to a substrate, comprising the steps of:
    (a) positioning at a predetermined location on the substrate a planar foundation layer formed from a fusible material having an elongated pile article attached thereto, the elongated pile article comprising an elongated support strand having a plurality of filament bundles attached thereto,
        wherein the substrate, the planar foundation layer, the support strand and the filament bundles each have a predetermined melting temperature associated therewith, and
        wherein the melting temperature of the planar foundation layer is lower than the melting temperature of the substrate, the melting temperature of the support strand and the melting temperature of the filament bundles,
    (b) applying ultrasonic energy to the elongated pile article thereby attaching the elongated pile article to the substrate and simultaneously melting the planar foundation layer in the vicinity of the elongated pile article, and
    (c) removing the remaining planar foundation layer from the substrate.

\* \* \* \* \*